F. Pimmer.
Excavator.
N° 395.
31,399.
Patented Feb. 12, 1861.
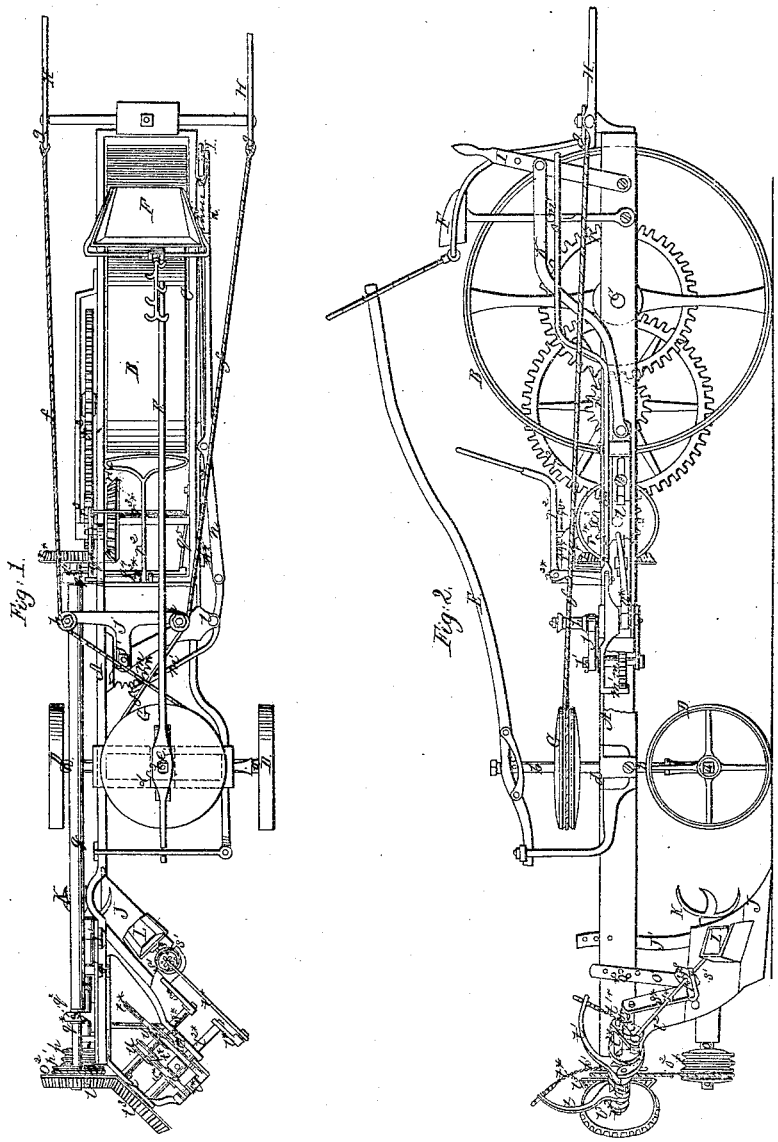
Witnesses:
Inventor:

UNITED STATES PATENT OFFICE.

FERDINAND PIMMER, OF GRAND JUNCTION, TENNESSEE.

DITCHING-PLOW.

Specification of Letters Patent No. 31,399, dated February 12, 1861.

*To all whom it may concern:*

Be it known that I, FERDINAND PIMMER, of Grand Junction, in the county of Hardeman and State of Tennessee, have invented a new and Improved Ditching-Plow; and I do hereby declare that the following is a full, clear, and exact description of the same, reference being had to the accompanying drawing, forming a part of this specification, in which—

Figure 1, represents a plan or top view of my invention. Fig. 2, is a side elevation of same.

Similar letters of reference in both views indicate corresponding parts.

The object of this invention is to produce a plow which will open a ditch to any desired depth, throw the dirt on one side by means of a reciprocating shovel and bevel the other side by the action of a rotary cutter, and which enables the driver to raise and lower the share or to throw it out of the ground altogether and also to cause the plow to run in any desired direction.

To enable those skilled in the art to make and use my invention, I will proceed to describe its construction and operation with reference to the drawings.

The frame A, of my plow is supported in front by the driving wheel B, which runs on the axle C, and the rear portion of the frame rests on the two wheels D, which are secured to an axle $a$. From the middle of this axle an arbor $b$, rises up vertically, and this arbor passes through a box $c$, that slides transversely across the frame between the guides $d$, and it has its bearing in a box $e$, which is firmly secured to the regulating lever E. This lever extends near to the driver's seat F, and it serves to impart to the arbor $b$, with the box $c$, a sliding motion in a direction transversely to the frame and also to raise and to lower the frame so as to cause the plow to work deeper or shallower or so as to throw the plow out of the ground altogether. For the purpose of guiding the direction in which the plow moves, a pulley or chain wheel G, is secured to the arbor $b$, and a chain $f$, the ends of which are screwed to hooks $g$, attached to the rear ends of the arms of the thill H, and which passes over guide pulleys $h$, is wound around said chain wheel and it is twisted so that a rotary motion of the thill in one direction produces a motion of the arbor $b$, and axle $a$, in the opposite direction.

In order to be able to tighten the chain $f$, the two guide pulleys $h$, are secured to an arm $j$, which can be brought closer to, or farther from the arbor $b$, by means of a hand lever I, on the side of the driver's seat. This lever connects by means of a rod $k$, with a slide $l$, to which the arm $j$, is secured by a pivot $j'$, and attached to this pivot is a toothed segment $m$, which is operated upon by a pawl $m'$. This pawl is hinged to a serrated bar $n$, which is connected to the hand lever I, and which, by catching into the edge of an upright $n'$, serves to hold said hand lever in its place. A spring $m^*$, which is secured to the side of the frame, keeps the bar $n$, in contact with the edge of the upright $n'$, and at the same time the pawl $m'$, in gear with the teeth of the segment $m$. By the action of the pawl $m'$, on the toothed segment $m$, the arm $j$, to which the guide pulleys $h$, are attached, can be turned according to the position of the slide $l$, and by this motion and by moving the slide nearer to or farther from the chain wheel G, the chain $f$, is kept tight no matter what the position of the thill may be.

The ditch is opened by an ordinary single plow share J, which is secured to the rear end of the frame A, by means of a standard $J'$, which is adjustable up and down by a series of holes. On the land side of this plow share, and secured to an arbor $o$, is the rotary cutter K, which serves to bevel that side of the ditch on which it acts, the other side being beveled by the action of the plow itself. The cutter K, is set higher or lower by a pendant $o'$, which is attached to the frame A, by a pin passing through one of the holes $o^*$, and motion is imparted to the said cutter by a belt or chain $o^2$, which passes over two pulleys $p$, $p'$, one of which is secured to the end of the arbor $o$, and the other to an arbor $q$, which receives its motion through a series of gear wheels $r$, $r'$, $r^2$, $r^3$, and through the bevel gear $r^*$, $r'^*$, from the driving wheel B. This arbor has its bearings in two journal boxes $q^*$, $q'^*$, and the box $q^*$, is secured between a standard $q^2$, by means of two pointed centers $q^{2*}$, in such a manner, that the same turns on a vertical axle and that the bevel wheel $r^*$, can be moved to and from the bevel wheel $r'^*$. The box $q'^*$, on the other hand, which is situated close behind the bevel wheel $r^*$, is so arranged, that it slides in and out between two guides $q^3$, and it is attached to a slide $q^4$, which is acted upon by an arm extending down in a vertical direction from the rock shaft $q^{4*}$. A spring $q^5$, which is secured to the inner side of the frame, has the tendency to bring the slide $q^4$, with the box $q'^*$, in such a position, that the bevel wheel $r^*$, is in gear with the wheel $r'^*$, and a bent lever $r^2$, which is hinged to a standard $r^{2*}$, that rises from the frame, acts upon an arm $r^{3*}$, extending in a horizontal direction from the rock-shaft $q^{4*}$. By depressing the lever $r^2$, the rock shaft is turned so as to move the box $q'^*$, away from the frame thereby throwing the bevel wheel $r^*$, out of gear. The lever $r^2$ is in such a position, that the same is depressed whenever the regulating lever E, is brought in such a position, that the plow is thrown entirely out of the ground.

The dirt which is thrown up by the plow share J, is removed and thrown on one side by the action of a shovel or spade L. This shovel is secured to rod $l^*$, to which a reciprocating motion is imparted by means of a crank $l'^*$, attached to the end of a rotary shaft $l^{2*}$. This shaft has its bearings in arms $l^2$, and it receives its motion from the arbor $q$, through a bevel gear $l^3$. The rod $l^*$, which bears the shovel L, passes through a disk or chuck $s$, which is hung between two centers $s'$, in the forked end of an arm $s^*$, that is secured to the end of an arbor $s'^*$. This arbor and arm serve to turn the shovel over at certain intervals and it is operated by means of two arms $t$, $t'$, which turn easily up and down on a pivot $t^*$. These arms connect by chains $t^*$, and $t'^*$, with rollers $u$, $u'$, that are secured to the arbor $s'^*$, and said chains are wound on the rollers $u$, $u'$, in opposite directions, so that by raising the arm $t$, the arbor $s'^*$ is turned in one, and by raising the arm $t'$, said arbor is turned in the other direction. The arms $t$, $t'$, are alternately raised by the action of cams $u^*$, and $u'^*$, which are firmly attached to the shaft $l^{2*}$, and the cams $u^*$, $u'^*$, are so shaped, that sufficient time is allowed to the shovel to take up the dirt and that it is thrown backward and forward with a rapid motion.

For the purpose of lessening the friction of the rod $l^*$, in the chuck $s$, the latter is provided with a series of balls, which form the bearing for said rod, so that the same can be moved in a longitudinal direction with the greatest facility. If the plow is now adjusted to the desired depth by means of the regulating lever E, and if it is drawn along by a horse or other draft animal attached to the thill H, the share J, opens the ditch, one side of which is beveled by the action of the rotary cutter K, and the other by the action of the share itself, and the dirt, which is thrown up by the share, is removed by the action of the shovel L. The direction of the plow can be changed at will, from the driver's seat and by having the thill connected with the chain wheel G, on the vertical arbor $b$, the two wheels D, are turned by the motion of the draft animal itself. By depressing the regulating lever E, the plow is thrown out of the ground and at the same time by the action of said lever on the bent lever $r^2$, the arbor $q$, and with it the machinery for operating the cutter K, and the shovel L, are thrown out of gear and the plow can be drawn from place to place or turned with the greatest facility. This plow is very convenient for farmers, it operates easy, it does its work perfect and it is so arranged, that all its parts are durable and easily kept in repair.

Having thus fully described my invention, what I claim as new and desire to secure by Letters Patent, is:

1. The arrangement of the chain or rope $f$, extending from the ends of the thill H, to the chain wheel G, on the arbor $b$, in combination with the guide pulleys $h$, slide $l$, and hand lever I, constructed and operating as and for the purpose described.

2. The arrangement of the bent lever $r^2$, rock shaft $q^{4*}$, slide $q^4$, and journal box $q'^*$, in combination with the regulating lever E, constructed and operating as and for the purpose set forth.

3. The arrangement of the rotary cutter K, in combination with the share J, as described, for the purpose of beveling one side of the ditch.

4. The arrangement of the reciprocating reversible shovel L, in combination with the share J, constructed and operating substantially in the manner and for the purpose set forth.

5. The arrangement of the arms $t$, $t'$, chains $t^*$, $t'^*$, pulleys $u$, $u'$, cams $u^*$, $u'^*$, and anti friction chuck $s$, in combination with the shovel L, constructed and operating in the manner and for the purpose specified.

FERDINAND PIMMER.

Witnesses:
WILLIAM A. PLEDGE,
H. W. SAUNDERS.